US012764695B2

(12) United States Patent
Ma

(10) Patent No.: US 12,764,695 B2
(45) Date of Patent: Oct. 13, 2026

(54) METHOD AND APPARATUS FOR REGISTERING TO IMS NETWORK, TERMINAL, AND READABLE STORAGE MEDIUM

(71) Applicant: VIVO MOBILE COMMUNICATION CO., LTD., Guangdong (CN)

(72) Inventor: Wenfei Ma, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 289 days.

(21) Appl. No.: 18/632,739

(22) Filed: Apr. 11, 2024

(65) Prior Publication Data

US 2024/0259981 A1 Aug. 1, 2024

Related U.S. Application Data

(63) Continuation of application No. PCT/CN2022/124033, filed on Oct. 9, 2022.

(30) Foreign Application Priority Data

Oct. 11, 2021 (CN) .......................... 202111180439.3

(51) Int. Cl.
*H04W 60/04* (2009.01)
*H04L 65/1016* (2022.01)
(Continued)

(52) U.S. Cl.
CPC ......... *H04W 60/04* (2013.01); *H04L 65/1016* (2013.01); *H04W 36/08* (2013.01); *H04W 36/30* (2013.01); *H04W 76/20* (2018.02)

(58) Field of Classification Search
CPC ..... H04W 60/04; H04W 76/20; H04W 36/08; H04W 36/30; H04W 76/12; H04W 76/16;
(Continued)

(56) References Cited

U.S. PATENT DOCUMENTS 10,477,438 B2 11/2019 Huang-Fu et al.
2015/0358477 A1 12/2015 Jeong et al.
(Continued)

FOREIGN PATENT DOCUMENTS

CN 107548148 A 1/2018
CN 109218330 A 1/2019
(Continued)

*Primary Examiner* — Rushil P. Sampat
(74) *Attorney, Agent, or Firm* — Price Heneveld LLP

(57) ABSTRACT

The present application discloses a method and an apparatus for registering to an IMS network, a terminal, and a readable storage medium. The method for registering to the IMS network is applied to a terminal supporting an IMS service, and the method includes: transmitting first network registration signaling to a current camped cell; receiving second signaling transmitted by the current camped cell in response to the first network registration signaling; and in a case that the second signaling includes indication information indicating that registration to the IMS network is not supported, performing one of the following: performing a cell handover operation, or displaying first prompt information, where the first prompt information is used to prompt a user to move the terminal to another location to attempt registration to the IMS network.

17 Claims, 4 Drawing Sheets

(51) Int. Cl.

| | |
|---|---|
| ***H04W 36/08*** | (2009.01) |
| ***H04W 36/30*** | (2009.01) |
| ***H04W 76/20*** | (2018.01) |

(58) Field of Classification Search

CPC ....... H04W 76/18; H04W 76/32; H04W 8/24; H04W 48/18; H04W 60/005; H04W 88/06; H04L 65/1016

See application file for complete search history.

(56) References Cited

U.S. PATENT DOCUMENTS

| | | | | |
|---|---|---|---|---|
| 2021/0314369 | A1* | 10/2021 | Lee | H04L 65/1073 |
| 2023/0007054 | A1 | 1/2023 | Huang et al. | |
| 2023/0049004 | A1* | 2/2023 | Kuppelur | H04L 65/1073 |
| 2023/0086087 | A1* | 3/2023 | Shen | H04W 8/24 370/328 |

FOREIGN PATENT DOCUMENTS

| | | | |
|---|---|---|---|
| CN | 111107058 | A | 5/2020 |
| CN | 111194078 | A | 5/2020 |
| CN | 111436071 | A | 7/2020 |
| CN | 111565441 | A | 8/2020 |
| CN | 111669793 | A | 9/2020 |
| CN | 113329352 | A | 8/2021 |
| CN | 113891410 | A | 1/2022 |
| WO | 2020190875 | A1 | 9/2020 |
| WO | 2021159307 | A1 | 8/2021 |
| WO | WO 2021164580 | A1 * | 8/2021 |

* cited by examiner

METHOD AND APPARATUS FOR REGISTERING TO IMS NETWORK, TERMINAL, AND READABLE STORAGE MEDIUM

CROSS-REFERENCE TO RELATED APPLICATIONS

This application is a Bypass Continuation Applications of PCT International Application No. PCT/CN2022/124033 filed on Oct. 9, 2022, which claims priority to Chinese Patent Application No. 202111180439.3, filed on Oct. 11, 2021 in China, which are incorporated herein by reference in their entireties.

TECHNICAL FIELD

This application pertains to the field of communication technologies, and specifically relates to a method and an apparatus for registering to an IMS network, a terminal, and a readable storage medium.

BACKGROUND

Currently, operators' Internet Protocol multimedia subsystem (IMS) networks are not well developed. In the process of implementing this application, the inventor finds that if a cell does not support an IMS function, a terminal camping on the cell cannot register to an IMS even if both the terminal and a subscriber identity module (SIM) card support the IMS function. When the terminal is stationary or moves within a small range, the terminal cannot perform a cell handover. As a result, the terminal cannot register to an IMS network, affecting user experience. In addition, with the gradual establishment of 5th generation mobile communication technology (5th-Generation, 5G) non-standalone (NSA) and standalone (SA), such problems have become increasingly prominent in newly added base stations and core networks.

SUMMARY

An objective of embodiments of this application is to provide a method and an apparatus for registering to an IMS network, a terminal, and a readable storage medium.

According to a first aspect, an embodiment of this application provides a method for registering to an IMS network, applied to a terminal supporting an IMS service. The method includes:

- transmitting first network registration signaling to a current camped cell;
- receiving second signaling transmitted by the current camped cell in response to the first network registration signaling; and
- in a case that the second signaling includes indication information indicating that registration to the IMS network is not supported, performing one of the following:
- performing a cell handover operation; or
- displaying first prompt information, where the first prompt information is used to prompt a user to move the terminal to another location to attempt registration to the IMS network.

According to a second aspect, an embodiment of this application provides an apparatus for registering to an IMS network, used in a terminal supporting an IMS service. The apparatus includes:

- a first transmitting module, configured to transmit first network registration signaling to a current camped cell;
- a first receiving module, configured to receive second signaling transmitted by the current camped cell in response to the first network registration signaling; and
- an execution module, configured to: in a case that the second signaling includes indication information indicating that registration to the IMS network is not supported, perform one of the following:
- perform a cell handover operation; or
- display first prompt information, where the first prompt information is used to prompt a user to move the terminal to another location to attempt registration to the IMS network.

According to a third aspect, an embodiment of this application provides a terminal. The terminal includes a processor, a memory, and a program or an instruction stored in the memory and executable on the processor. When the program or the instruction is executed by the processor, the steps of the method according to the first aspect are implemented.

According to a fourth aspect, an embodiment of this application provides a readable storage medium. The readable storage medium stores a program or an instruction. When the program or the instruction is executed by a processor, the steps of the method according to the first aspect are implemented.

According to a fifth aspect, an embodiment of this application provides a chip. The chip includes a processor and a communication interface, the communication interface is coupled to the processor, and the processor is configured to run a program or an instruction, to implement the steps of the method according to the first aspect.

According to a sixth aspect, a computer software product is provided. The computer software product is stored in a non-transient storage medium, and the computer software product is executed by at least one processor to implement the steps of the method according to the first aspect.

According to a seventh aspect, a communication device is provided, and configured to perform the steps of the method according to the first aspect.

DESCRIPTION OF EMBODIMENTS

Technical solutions in embodiments of this application are clearly described below with reference to accompanying drawings in embodiments of this application. Apparently, the described embodiments are some but not all of embodiments of this application. All other embodiments obtained by a person of ordinary skill in the art based on embodiments of this application shall fall within the protection scope of this application.

The terms “first”, “second”, and the like in this specification and claims of this application are used to distinguish between similar objects instead of describing a specific order or sequence. It should be understood that terms used in such a way are interchangeable in proper circumstances, so that embodiments of this application can be implemented in an order other than the order illustrated or described herein. Objects classified by “first”, “second”, and the like are usually of a same type, and a quantity of objects is not limited. For example, there may be one or more first objects. In addition, in this specification and the claims, “and/or” indicates at least one of connected objects, and a character “/” generally indicates an “or” relationship between associated objects.

With reference to the accompanying drawings, a method and an apparatus for registering to an IMS network, a terminal, and a readable storage medium provided in embodiments of this application are described in detail by using specific embodiments and application scenarios.

Figure 1:
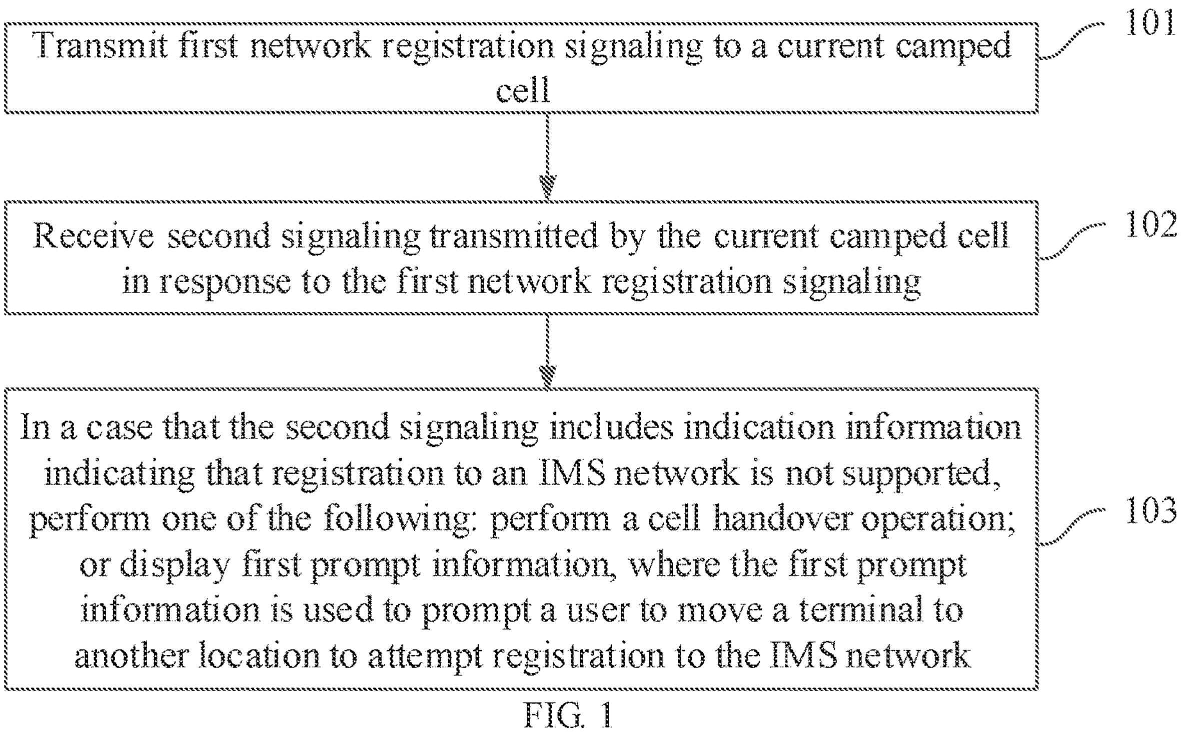
FIG. 1 is a schematic flowchart of a method for registering to an IMS network according to an embodiment of this application.

FIG. 1 is a schematic flowchart of a method for registering to an IMS network according to an embodiment of this application. As shown in FIG. 1, the method for registering to the IMS network in this embodiment of this application is applied to a terminal supporting an IMS service. The method includes the following steps.

Step 101: Transmit first network registration signaling to a current camped cell.

In this step, when performing registration to a 4th generation mobile communication technology long term evolution (4G LTE) network or 5G new radio (NR) network, the terminal transmits first network registration signaling to a current camped cell, and reports a voice capability that an IMS is preferentially used.

In some embodiments of this application, in a case that the current camped cell of the terminal uses a 4G LTE network standard, the first network registration signaling is an attach request, or in a case that the current camped cell uses a 5G NR network standard, the first network registration signaling is a UE capability information message.

Step 102: Receive second signaling transmitted by the current camped cell in response to the first network registration signaling.

After receiving the first network registration signaling transmitted by the terminal, the current camped cell transmits second signaling to the terminal in response to the first network registration signaling. The terminal receives the second signaling, to analyze whether a SIM card of the terminal or the current camped cell supports an IMS service from the second signaling.

In some embodiments of this application, in a case that the current camped cell of the terminal uses the 4G LTE network standard, the second signaling is an attach accept message corresponding to the attach request; or in a case that the current camped cell uses the 5G NR network standard, the second signaling is a registration accept message corresponding to the UE capability information message.

Step 103: In a case that the second signaling includes indication information indicating that registration to the IMS network is not supported, perform one of the following:

perform a cell handover operation; or display first prompt information, where the first prompt information is used to prompt a user to move the terminal to another location to attempt registration to the IMS network.

In this embodiment of this application, the terminal determines whether the second signaling includes indication information indicating that registration to the IMS network is not supported or includes indication information indicating that registration to the IMS network is supported. If the second signaling includes indication information indicating that registration to the IMS network is not supported, it indicates that the current camped cell or the SIM card of the terminal does not support an IMS function, that is, the terminal cannot register to an IMS network in the current camped cell. To improve a success rate of registering to an IMS network by the terminal, in a case that the second signaling includes indication information indicating that registration to the IMS network is not supported, the terminal performs a cell handover operation, where the cell handover operation can be performed to hand over the terminal from the current camped cell to one of neighboring cells. Through handover from the current camped cell to another cell, the terminal can attempt registration to the IMS network again in the another cell. Alternatively, in a case that the second signaling includes indication information indicating that registration to the IMS network is not supported, the terminal displays first prompt information, where the first prompt information is used to prompt a user to move the terminal to another location to attempt registration to the IMS network. That is, the terminal prompts, through a user interface (UI), the user to move the terminal to another location, so as to change the current camped cell of the terminal, so that the terminal can attempt registration to the IMS network again in another cell.

Therefore, in this embodiment of this application, if the terminal cannot register to an IMS network in the current camped cell, the terminal performs the cell handover operation to register to the IMS network in a new cell, or displays the first prompt information to prompt the user to move the terminal to another location to attempt registration to the IMS network again. This can improve a success rate of registering to the IMS network.

In some embodiments of this application, the step of performing a cell handover operation includes:

a determining step: determining a target cell from neighboring cells of the current camped cell of the terminal, and reporting a measurement report to a network side, where the measurement report is used for the network side to hand over the terminal from the current camped cell to the target cell;

a transmitting and receiving step: after the terminal is handed over to the target cell, transmitting first network registration signaling to the current camped cell, and receiving second signaling transmitted by the target cell in response to the first network registration signaling; and in a case that the second signaling includes indication information indicating that registration to the IMS network is supported, performing registration to the IMS network; or in a case that the second signaling includes indication information indicating that registration to the IMS network is not supported, repeating the determining step and the transmitting and receiving step until the received second signaling includes indication information indicating that registration to the IMS network is supported or a quantity of cell handovers reaches a preset threshold.

Specifically, that the second signaling includes indication information indicating that registration to the IMS network is not supported is that the current camped cell or the SIM card of the terminal does not support an IMS function, that is, the terminal cannot register to an IMS network in the current camped cell. A target cell is determined from neighboring cells of the current camped cell of the terminal, and a measurement report is reported to a network side, where the measurement report may trigger the network side to hand over the terminal from the current camped cell to the target cell. In other words, after receiving the measurement report reported by the terminal, the network side hands over the terminal from the current camped cell to the target cell based on content in the measurement report. In this way, after the terminal is handed over and connected to the target cell, the terminal uses the target cell as a new current camped cell, transmits first network registration signaling to the new current camped cell, and receives second signaling transmitted by the new current camped cell in response to the first network registration signaling. In this case, if the second signaling includes indication information indicating that registration to the IMS network is supported, registration to the IMS network is performed through the new current camped cell. If the second signaling includes indication information indicating that registration to the IMS network is not supported, the step of determining a target cell from neighboring cells of the current camped cell of the terminal is returned to. That is, a target cell is determined from neighboring cells of the current camped cell of the terminal, and then the target cell is used as a new current camped cell, first network registration signaling is transmitted to the new current camped cell, and second signaling transmitted by the new current camped cell in response to the first network registration signaling is received, to implement handovers of cells one by one. Then attempts are made in neighboring cells one by one until the received second signaling includes indication information indicating that registration to the IMS network is supported and registration to the IMS network is finally implemented, or until a quantity of cell handovers reaches a preset threshold, to prevent the terminal from constantly performing cell handovers because the SIM card does not support an IMS service function.

In some other embodiments of this application, the method further includes:

in a case that the quantity of cell handovers reaches the preset threshold, displaying second prompt information, where the second prompt information is used to prompt the user that a current SIM card does not support an IMS service.

In other words, in the step of performing a cell handover operation, if the quantity of cell handovers reaches the preset threshold, it indicates that it is probably because a SIM card currently installed in the terminal does not support an IMS function but not because cells to which the terminal has been handed over do not support an IMS function. Therefore, second prompt information may be displayed in this case to prompt that the SIM card currently installed in the terminal does not support an IMS service. For example, the second prompt information is as follows: "The current SIM card does not support IMS services. Please contact customer service to activate IMS services."

In some embodiments of this application, optionally, in a case that the quantity of cell handovers reaches the preset threshold, a cell handover may stop, that is, the cell handover operation stops. Specifically, if registration to the IMS network still fails after a plurality of cell handovers, neighboring cells of a cell in which the terminal is located may not support an IMS network. Therefore, a handover may stop when the quantity of cell handovers reaches the preset threshold, to avoid excessive power consumption caused by frequent cell handovers. For example, the preset threshold may be 3.

In some embodiments of this application, the determining a target cell from neighboring cells of the current camped cell of the terminal includes:

ranking the neighboring cells of the current camped cell of the terminal based on signal strength and/or signal quality, detected by the terminal, of the neighboring cells, where signal strength or signal quality or both of a cell ranked higher are better; and selecting and determining a cell ranked highest from the neighboring cells as the target cell, where the target cell determined in a current determining step is different from a target cell determined in any previous determining step.

When a target cell is determined from neighboring cells of the current camped cell of the terminal, the neighboring cells may be first ranked based on detected signal strength and/or signal quality of the cells, where a cell with better signal strength and/or signal quality is ranked higher. Then, a cell ranked highest is selected from the neighboring cells to which the terminal has not been connected as the target cell. Therefore, when the network side is triggered to perform a cell handover, a cell with a better signal condition is preferentially considered to meet a handover condition. Because an objective of operations of determining the target cell and handing over the terminal from the current camped cell to the target cell is to attempt registration to the IMS network in the target cell, the currently determined target cell is different from a cell that has been previously determined as a target cell, to avoid repeatedly attempting registration to the IMS network in a same cell.

In some other embodiments of this application, before the reporting a measurement report to a network side, the method further includes:

receiving a radio resource control (RRC) connection reconfiguration message transmitted by the network side; and adjusting signal strength and/or signal quality of the target cell in the measurement report based on a configuration parameter in the RRC connection reconfiguration message, so that the measurement report triggers the network side to hand over the terminal from the current camped cell to the target cell.

During registration to the 4G LTE network or 5G NR network, the network side transmits an RRC connection reconfiguration message to the terminal, and the terminal receives the RRC connection reconfiguration message. The RRC connection reconfiguration message includes a configuration parameter, and the configuration parameter includes a threshold of a related measurement event. Therefore, in embodiments of this application, signal strength or signal quality or both of the target cell in the measurement report to be reported by the terminal to the network side are adjusted based on the configuration parameter, that is, a false measurement report is reported, so that the network side triggers a cell handover to hand over the terminal from the current camped cell to the target cell.

In some embodiments of this application, optionally, that the second signaling includes indication information indicating that registration to the IMS network is not supported is that an attribute value of IMS voice over PS session in S1 mode (IMS VoPS) in the second signaling is 0, and that the second signaling includes indication information indicating that registration to the IMS network is supported is that the attribute value of IMS VoPS in the second signaling is 1.

In other words, the second signaling includes parameter IMS VoPS. If IMS VoPS=0, it indicates that the second signaling includes indication information indicating that registration to the IMS network is not supported. If IMS VoPS=1, it indicates that the second signaling includes indication information indicating that registration to the IMS network is supported.

Figure 2:
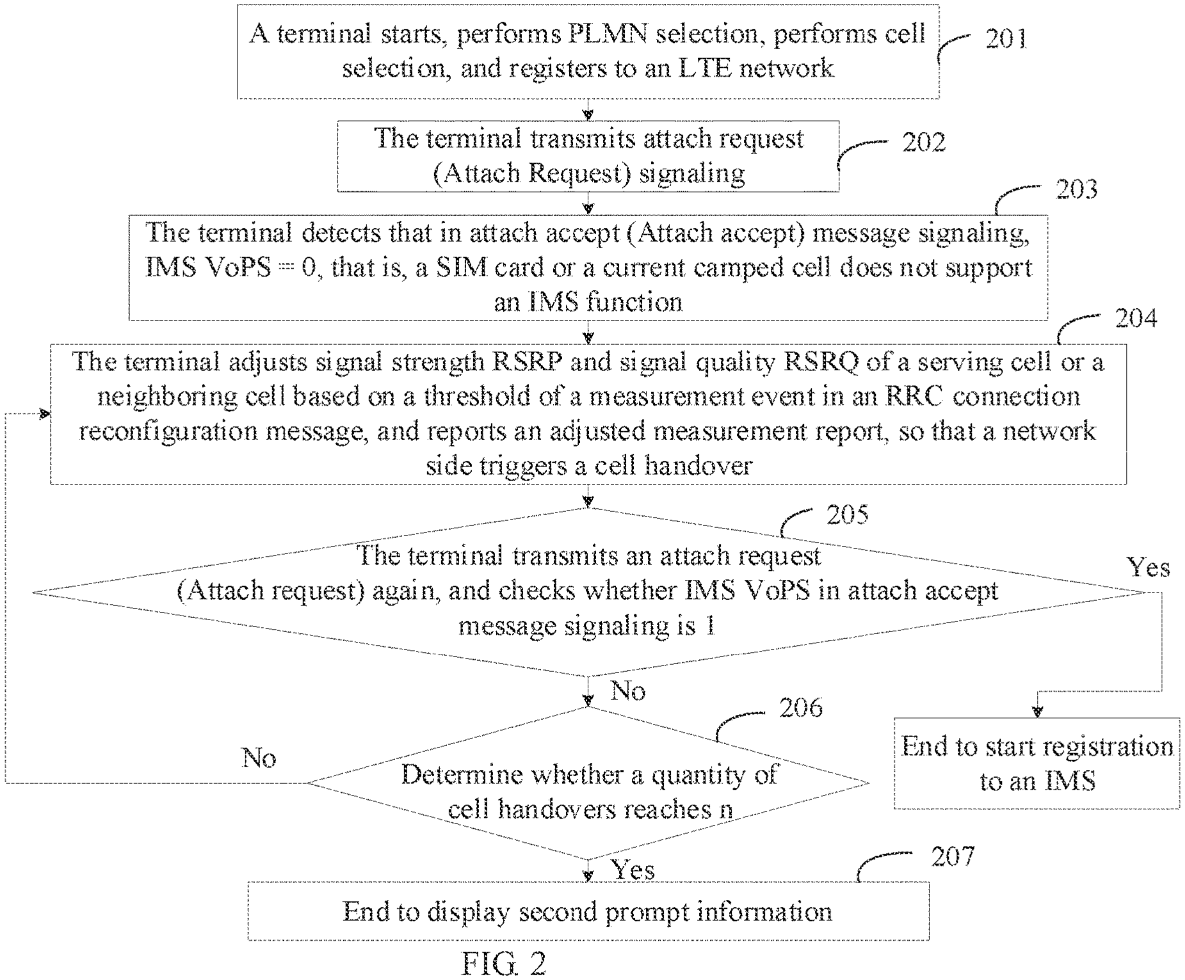
FIG. 2 is a schematic flowchart of another method for registering to an IMS network according to an embodiment of this application.

FIG. 2 is a schematic flowchart of another method for registering to an IMS network according to an embodiment of this application. As shown in FIG. 2, this embodiment of this application provides another method for registering to an IMS network. A 4G LTE network is used as an example, and the method includes the following steps.

Step 201: A terminal starts, performs public land mobile network (PLMN) selection, performs cell selection, and registers to an LTE network. After the terminal starts, the terminal selects a mobile communication service provider, and then selects a cell with a good signal, and registers to a corresponding LTE network.

Step 202: The terminal transmits an attach request to a current camped cell.

Step 203: The terminal detects that in received attach accept signaling, IMS VoPS=0, that is, a SIM card or the current camped cell does not support an IMS function.

Step 204: The terminal adjusts signal strength reference signal received power (RSRP) and signal quality reference signal received quality (RSRQ) of a serving cell or a neighboring cell based on a threshold of a measurement event in an RRC connection reconfiguration message, and reports an adjusted measurement report, so that a network side triggers a cell handover.

Step 205: After the terminal is handed over to the neighboring cell, the terminal transmits an attach request again, and checks whether IMS VoPS in attach accept signaling is 1. If yes, registration to an IMS network is started, or if no, step 206 is performed.

Step 206: Determine whether a quantity of handovers to neighboring cells reaches n (n is a preset threshold). If no, step 204 is returned to, or if yes, step 207 is performed.

Step 207: End to display second prompt information, for example, display information indicating that the current SIM card does not support an IMS service, to prompt a user to activate an IMS service.

In this embodiment of this application, optionally, the terminal may check whether voice domain preference in the transmitted attach request is equal to 3. If voice domain preference is equal to 3, it indicates that the terminal itself supports an IMS function.

In this embodiment of this application, if the foregoing 4G network environment is replaced by a 5G network environment, a 5G NR network is registered to in step 201, UE capability information is transmitted to the current camped cell in step 202, registration accept, which also includes an attribute value of IMS VoPS, is received in step 203, and corresponding signals in subsequent steps change accordingly. Details are not described herein again.

In this embodiment of this application, if the terminal cannot register to an IMS network in the current camped cell, the terminal performs a cell handover operation to register to the IMS network in a new cell. This can improve a success rate of registering to the IMS network.

Figure 3:
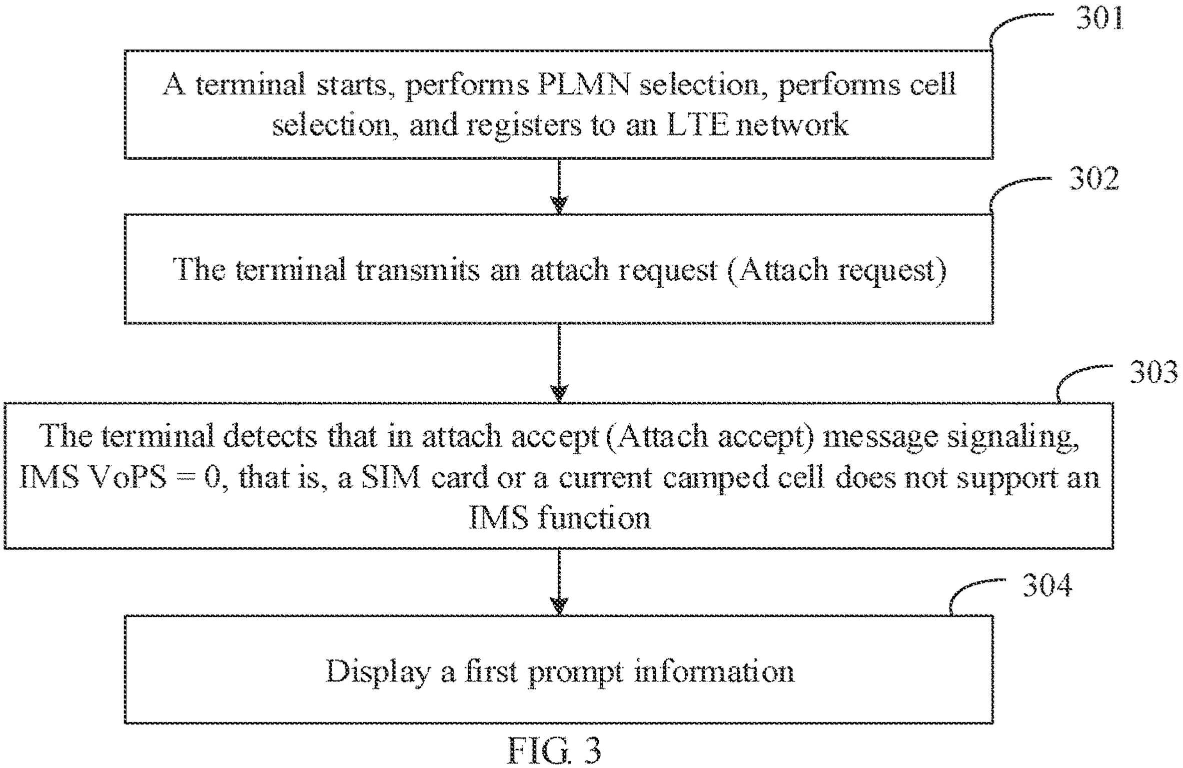
FIG. 3 is a schematic flowchart of still another method for registering to an IMS network according to an embodiment of this application.

FIG. 3 is a schematic flowchart of still another method for registering to an IMS network according to an embodiment of this application. As shown in FIG. 3, this embodiment of this application provides still another method for registering to an IMS network. A 4G LTE network is used as an example, and the method includes the following steps.

Step 301: A terminal starts, performs PLMN selection, performs cell selection, and registers to an LTE network, where a PLMN is a public land mobile network. After the terminal starts, the terminal selects a mobile communication service provider, and then selects a cell with a good signal, and registers to a corresponding LTE network.

Step 302: The terminal transmits an attach request to a current camped cell.

Step 303: The terminal detects that in received attach accept signaling, IMS VoPS=0, that is, a SIM card or the current camped cell does not support an IMS function.

Step 304: Display first prompt information, to prompt a user to move the terminal to another location to attempt registration to an IMS network.

Optionally, the terminal may check whether voice domain preference in the transmitted attach request is equal to 3. If voice domain preference is equal to 3, it indicates that the terminal itself supports an IMS function.

In this embodiment of this application, if the foregoing 4G network environment is replaced by a 5G network environment, a 5G NR network is registered to in step 301, UE capability information is transmitted to the current camped cell in step 302, and registration accept, which also includes an attribute value of IMS VoPS, is received in step 303. Details are not described herein again.

In this embodiment of this application, if the terminal cannot register to an IMS network in the current camped cell, the terminal displays the first prompt information to prompt the user to move the terminal to another location to attempt registration to the IMS network again. This can improve a success rate of registering to the IMS network and avoid excessive power consumption caused by frequent cell handovers.

It should be noted that, the method for registering to the IMS network provided in embodiments of this application may be performed by an apparatus for registering to an IMS network or a control module that is in the apparatus for registering to the IMS network and that is configured to perform the method for registering to the IMS network. In an embodiment of this application, an apparatus for registering to an IMS network according to this embodiment of this application is described by using an example in which the apparatus for registering to the IMS network performs the method for registering to the IMS network.

Figure 4:
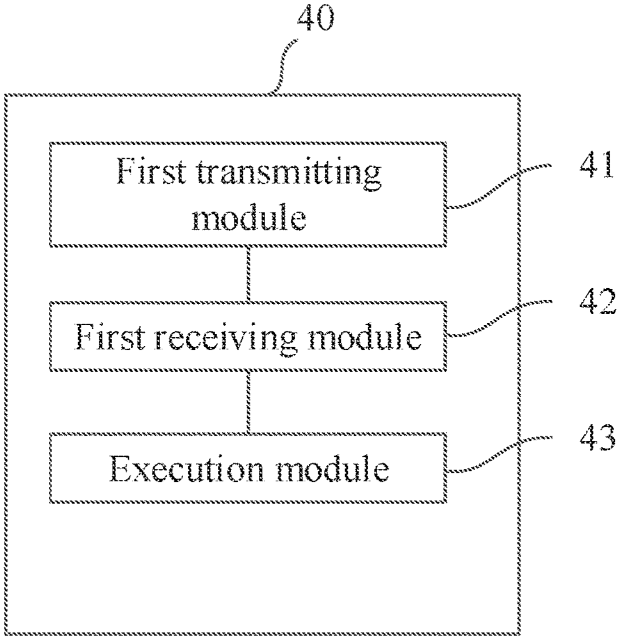
FIG. 4 is a schematic diagram of a structure of an apparatus for registering to an IMS network according to an embodiment of this application.

FIG. 4 is a schematic diagram of a structure of an apparatus for registering to an IMS network according to an embodiment of this application. As shown in FIG. 4, the apparatus for registering to the IMS network in this embodiment of this application is used in a terminal supporting an IMS service. The apparatus 40 includes:

a first transmitting module 41, configured to transmit first network registration signaling to a current camped cell;

a first receiving module 42, configured to receive second signaling transmitted by the current camped cell in response to the first network registration signaling; and an execution module 43, configured to: in a case that the second signaling includes indication information indicating that registration to the IMS network is not supported, perform one of the following:

perform a cell handover operation; or display first prompt information, where the first prompt information is used to prompt a user to move the terminal to another location to attempt registration to the IMS network.

Optionally, the cell handover operation includes:

a determining step: determining a target cell from neighboring cells of the current camped cell of the terminal, and reporting a measurement report to a network side, where the measurement report is used for the network side to hand over the terminal from the current camped cell to the target cell;

a transmitting and receiving step: after the terminal is handed over to the target cell, transmitting first network registration signaling to the current camped cell, and receiving second signaling transmitted by the target cell in response to the first network registration signaling; and in a case that the second signaling includes indication information indicating that registration to the IMS network is supported, performing registration to the IMS network; or in a case that the second signaling includes indication information indicating that registration to the IMS network is not supported, repeating the determining step and the transmitting and receiving step until the received second signaling includes indication information indicating that registration to the IMS network is supported or a quantity of cell handovers reaches a preset threshold.

Optionally, the apparatus further includes:

a display module, configured to: in a case that the quantity of cell handovers reaches the preset threshold, display second prompt information, where the second prompt information is used to prompt the user that a current SIM card does not support an IMS service.

Optionally, the execution module includes:

a ranking unit, configured to rank the neighboring cells of the current camped cell of the terminal based on signal strength and/or signal quality, detected by the terminal, of the neighboring cells, where signal strength or signal quality or both of a cell ranked higher are better; and a determining unit, configured to select and determine a cell ranked highest from the neighboring cells as the target cell, where the target cell determined in a current determining step is different from a target cell determined in any previous determining step.

Optionally, the apparatus further includes:

a second receiving module, configured to receive an RRC connection reconfiguration message transmitted by the network side; and an adjustment module, configured to adjust signal strength and/or signal quality of the target cell in the measurement report based on a configuration parameter in the RRC connection reconfiguration message, so that the measurement report triggers the network side to hand over the terminal from the current camped cell to the target cell.

Optionally, in a case that the current camped cell uses a 4G LTE network standard, the first network registration signaling is an attach request, and the second signaling is an attach accept message; or in a case that the current camped cell uses a 5G NR network standard, the first network registration signaling is a UE capability information message, and the second signaling is a registration accept message.

Optionally, that the second signaling includes indication information indicating that registration to the IMS network is not supported is that an attribute value of IMS VoPS in the second signaling is 0, and that the second signaling includes indication information indicating that registration to the IMS network is supported is that the attribute value of IMS VoPS in the second signaling is 1.

In this embodiment of this application, if a terminal cannot register to an IMS network in a current camped cell, the terminal performs a cell handover operation to register to the IMS network in a new cell, or displays first prompt information to prompt a user to move the terminal to another location to attempt registration to the IMS network again. This can improve a success rate of registering to the IMS network.

The apparatus for registering to the IMS network in this embodiment of this application may be an apparatus, or a component, an integrated circuit, or a chip in a terminal. The apparatus may be a mobile phone, a tablet computer, a notebook computer, a palmtop computer, an in-vehicle terminal, a wearable device, an ultra-mobile personal computer (UMPC), a netbook, a personal digital assistant (PDA), or the like. This is not specifically limited in embodiments of this application.

The apparatus for registering to the IMS network in this embodiment of this application may be an apparatus with an operating system. The operating system may be an Android operating system, an iOS operating system, or another possible operating system. This is not specifically limited in embodiments of this application.

The apparatus for registering to the IMS network provided in this embodiment of this application can implement the processes implemented in the method embodiments in FIG. 1 to FIG. 3. To avoid repetition, details are not described herein again.

Figure 5:
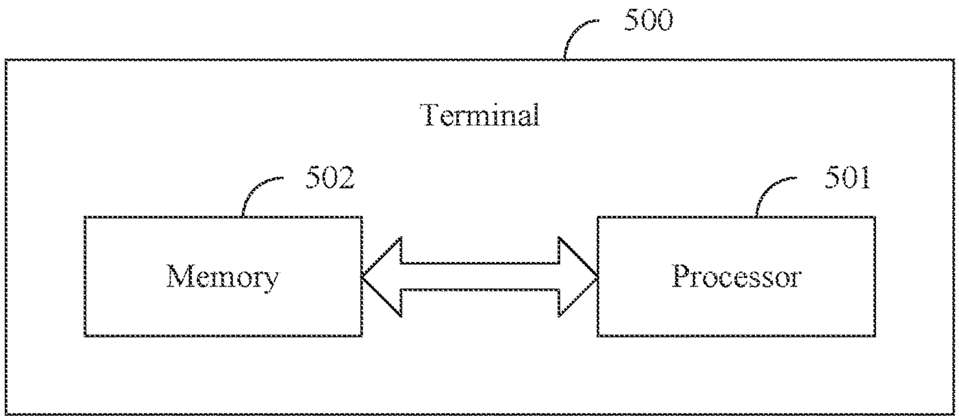
FIG. 5 is a schematic diagram of a structure of a terminal according to an embodiment of this application.

As shown in FIG. 5, an embodiment of this application further provides a terminal 500, including a processor 501, a memory 502, and a program or an instruction stored in the memory 502 and executable on the processor 501. When the program or the instruction is executed by the processor 501, the processes in the foregoing embodiments of the method for registering to the IMS network are implemented and a same technical effect can be achieved. To avoid repetition, details are not described herein again.

It should be noted that, the terminal in embodiments of this application includes a mobile terminal and a non-mobile terminal.

Figure 6:
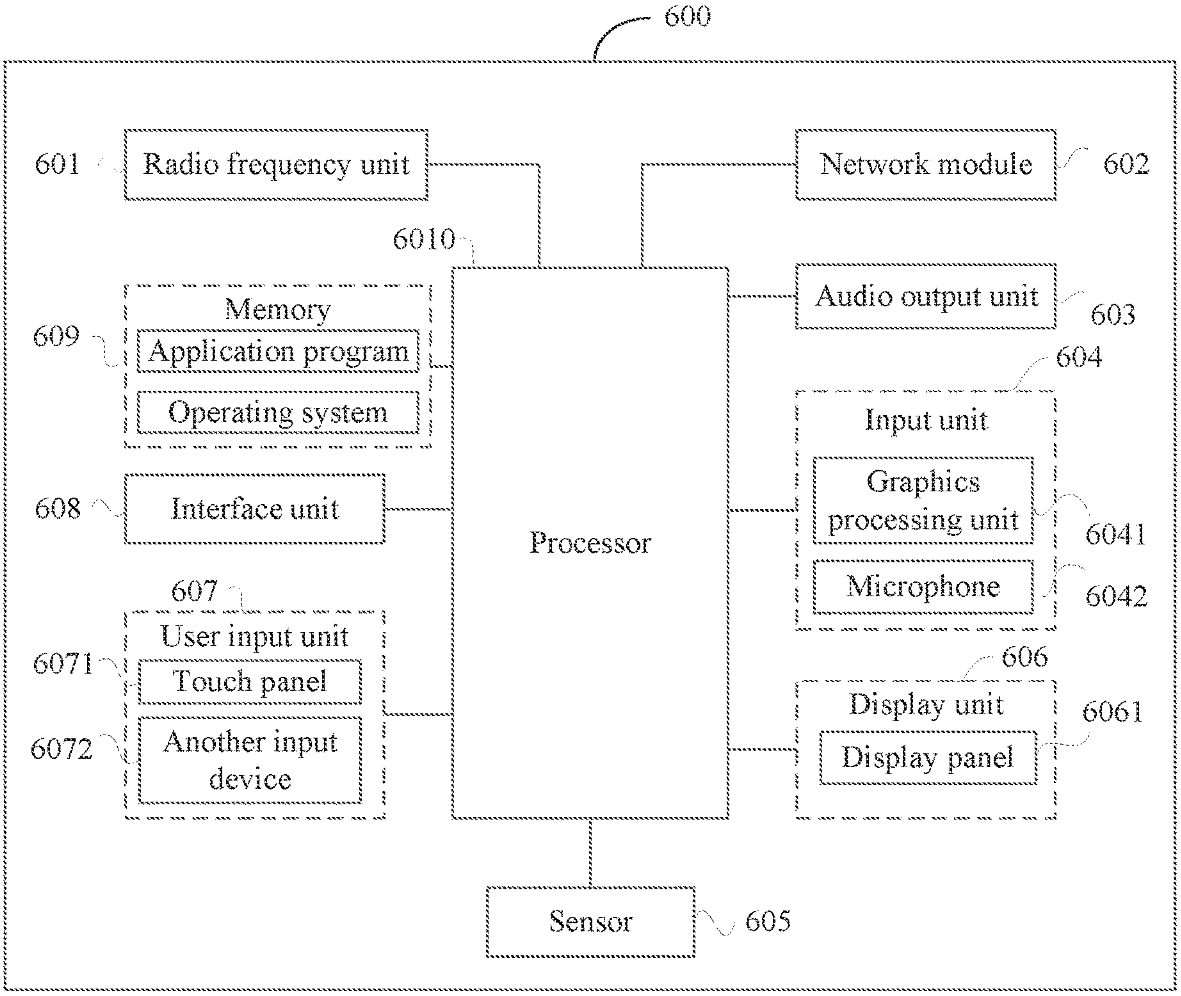
FIG. 6 is a schematic diagram of a hardware structure of a terminal according to an embodiment of this application.

FIG. 6 is a schematic diagram of a hardware structure of a terminal according to an embodiment of this application.

The terminal 600 includes but is not limited to components such as a radio frequency unit 601, a network module 602, an audio output unit 603, an input unit 604, a sensor 605, a display unit 606, a user input unit 607, an interface unit 608, a memory 609, and a processor 6010.

A person skilled in the art can understand that the terminal 600 may further include a power supply (such as a battery) that supplies power to each component. The power supply may be logically connected to the processor 6010 by using a power supply management system, to implement functions such as charging and discharging management, and power consumption management by using the power supply management system. The structure of the terminal shown in FIG. 6 constitutes no limitation on the terminal, and the terminal may include more or fewer components than those shown in the figure, or combine some components, or have a different component arrangement. Details are not described herein.

The radio frequency unit 601 is configured to transmit first network registration signaling to a current camped cell.

The radio frequency unit 601 is further configured to receive second signaling transmitted by the current camped cell in response to the first network registration signaling.

The processor 6010 is configured to perform a cell handover operation in a case that the second signaling includes indication information indicating that registration to an IMS network is not supported.

The display unit 606 is configured to display first prompt information in a case that the second signaling includes indication information indicating that registration to the IMS network is not supported, where the first prompt information is used to prompt a user to move the terminal to another location to attempt registration to the IMS network.

Optionally, the cell handover operation includes:

a determining step: determining a target cell from neighboring cells of the current camped cell of the terminal, and reporting a measurement report to a network side, where the measurement report is used for the network side to hand over the terminal from the current camped cell to the target cell;

a transmitting and receiving step: after the terminal is handed over to the target cell, transmitting first network registration signaling to the current camped cell, and receiving second signaling transmitted by the target cell in response to the first network registration signaling; and in a case that the second signaling includes indication information indicating that registration to the IMS network is supported, performing registration to the IMS network; or in a case that the second signaling includes indication information indicating that registration to the IMS network is not supported, repeating the determining step and the transmitting and receiving step until the received second signaling includes indication information indicating that registration to the IMS network is supported or a quantity of cell handovers reaches a preset threshold.

Optionally, the display unit 606 is further configured to: in a case that the quantity of cell handovers reaches the preset threshold, display second prompt information, where the second prompt information is used to prompt the user that a current SIM card does not support an IMS service.

Optionally, the processor 6010 is further configured to rank the neighboring cells of the current camped cell of the terminal based on signal strength and/or signal quality, detected by the terminal, of the neighboring cells, where signal strength or signal quality or both of a cell ranked higher are better.

The processor 6010 is further configured to select and determine a cell ranked highest from the neighboring cells as the target cell, where the target cell determined in a current determining step is different from a target cell determined in any previous determining step.

Optionally, the radio frequency unit 601 is further configured to receive an RRC connection reconfiguration message transmitted by the network side.

The processor 6010 is further configured to adjust signal strength and/or signal quality of the target cell in the measurement report based on a configuration parameter in the RRC connection reconfiguration message, so that the measurement report triggers the network side to hand over the terminal from the current camped cell to the target cell.

Optionally, in a case that the current camped cell uses a 4G LTE network standard, the first network registration signaling is an attach request, and the second signaling is an attach accept message; or in a case that the current camped cell uses a 5G NR network standard, the first network registration signaling is a UE capability information message, and the second signaling is a registration accept message.

Optionally, that the second signaling includes indication information indicating that registration to the IMS network is not supported is that an attribute value of IMS VoPS in the second signaling is 0, and that the second signaling includes indication information indicating that registration to the IMS network is supported is that the attribute value of IMS VoPS in the second signaling is 1.

In this embodiment of this application, if the terminal cannot register to an IMS network in the current camped cell, the terminal performs the cell handover operation to register to the IMS network in a new cell, or displays the first prompt information to prompt the user to move the terminal to another location to attempt registration to the IMS network again. This can improve a success rate of registering to the IMS network.

It should be understood that in this embodiment of this application, the input unit 604 may include a graphics processing unit (GPU) 6041 and a microphone 6042. The graphics processing unit 6041 processes image data of a static picture or a video obtained by an image capture apparatus (such as a camera) in a video capture mode or an image capture mode. The display unit 606 may include a display panel 6061. The display panel 6061 may be configured in a form such as a liquid crystal display or an organic light-emitting diode. The user input unit 607 includes a touch panel 6071 and another input device 6072. The touch panel 6071 is also referred to as a touchscreen. The touch panel 6071 may include two parts: a touch detection apparatus and a touch controller. The another input device 6072 may include but is not limited to a physical keyboard, a functional button (such as a volume control button or a power on/off button), a trackball, a mouse, and a joystick. Details are not described herein. The memory 609 may be configured to store a software program and various data, including but not limited to an application program and an operating system. An application processor and a modem processor may be integrated into the processor 6010, the application processor mainly processes an operating system, a user interface, an application program, and the like, and the modem processor mainly processes wireless communication. It can be understood that, alternatively, the modem processor may not be integrated into the processor 6010.

An embodiment of this application further provides a readable storage medium. The readable storage medium may be non-volatile or volatile, and the readable storage medium stores a program or an instruction. When the program or the instruction is executed by a processor, the processes in the foregoing embodiments of the method for registering to the IMS network are implemented and a same technical effect can be achieved. To avoid repetition, details are not described herein again.

The processor is a processor in the terminal in the foregoing embodiments. The readable storage medium includes a computer-readable storage medium, such as a computer read-only memory (ROM), a random access memory (RAM), a magnetic disk, or an optical disc.

An embodiment of this application further provides a chip. The chip includes a processor and a communication interface, the communication interface is coupled to the processor, and the processor is configured to run a program or an instruction to implement the processes in the foregoing embodiments of the method for registering to the IMS network, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element defined by "includes a . . . " does not preclude the existence of other identical elements in the process, method, article, or apparatus that includes the element. In addition, it should be noted that, the scope of the method and the apparatus in embodiments of this application is not limited to performing functions in an illustrated or discussed sequence, and may further include performing functions in a basically simultaneous manner or in a reverse sequence based on the involved functions. For example, the described method may be performed in an order different from the described order, and various steps may be added, omitted, or combined. In addition, features described with reference to some examples may be combined in other examples.

Based on the descriptions of the foregoing implementations, a person skilled in the art may clearly understand that the method in the foregoing embodiments may be implemented by software in addition to a necessary universal hardware platform or by hardware only. In most circumstances, the former is a preferred implementation. Based on such an understanding, the technical solutions of this application essentially or a part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, a network device, or the like) to perform the method described in embodiments of this application.

Embodiments of this application are described above with reference to the accompanying drawings, but this application is not limited to the foregoing specific implementations, and the specific implementations are only illustrative and not restrictive. Under the enlightenment of this application, a person of ordinary skill in the art can make many forms without departing from the purpose of this application and the protection scope of the claims, all of which fall within the protection of this application.

The invention claimed is:

1. A method for registering to an IMS network, applied to a terminal supporting an IMS service, wherein the method comprises:

transmitting first network registration signaling to a current camped cell;

receiving second signaling transmitted by the current camped cell in response to the first network registration signaling; and in a case that the second signaling comprises indication information indicating that registration to the IMS network is not supported, performing one of the following:

performing a cell handover operation; or displaying first prompt information, wherein the first prompt information is used to prompt a user to move the terminal to another location to attempt registration to the IMS network;

wherein the performing a cell handover operation comprises:

a determining step: determining a target cell from neighboring cells of the current camped cell of the terminal, and reporting a measurement report to a network side, wherein the measurement report is used for the network side to hand over the terminal from the current camped cell to the target cell;

a transmitting and receiving step: after the terminal is handed over to the target cell, transmitting first network registration signaling to the current camped cell, and receiving second signaling transmitted by the target cell in response to the first network registration signaling; and in a case that the second signaling comprises indication information indicating that registration to the IMS network is supported, performing registration to the IMS network; or in a case that the second signaling comprises indication information indicating that registration to the IMS network is not supported, repeating the determining step and the transmitting and receiving step until the received second signaling comprises indication information indicating that registration to the IMS network is supported or a quantity of cell handovers reaches a preset threshold.

2. The method according to claim 1, wherein the method further comprises:

in a case that the quantity of cell handovers reaches the preset threshold, displaying second prompt information, wherein the second prompt information is used to prompt the user that a current SIM card does not support an IMS service.

3. The method according to claim 1, wherein the determining a target cell from neighboring cells of the current camped cell of the terminal comprises:

ranking the neighboring cells of the current camped cell of the terminal based on signal strength and/or signal quality, detected by the terminal, of the neighboring cells, wherein signal strength or signal quality or both of a cell ranked higher are better; and selecting and determining a cell ranked highest from the neighboring cells as the target cell, wherein the target cell determined in a current determining step is different from a target cell determined in any previous determining step.

4. The method according to claim 1, wherein before the reporting a measurement report to a network side, the method further comprises:

receiving an RRC connection reconfiguration message transmitted by the network side; and adjusting signal strength and/or signal quality of the target cell in the measurement report based on a configuration parameter in the RRC connection reconfiguration message, so that the measurement report triggers the network side to hand over the terminal from the current camped cell to the target cell.

5. The method according to claim 1, wherein in a case that the current camped cell uses a 4G LTE network standard, the first network registration signaling is an attach request, and the second signaling is an attach accept message; or in a case that the current camped cell uses a 5G NR network standard, the first network registration signaling is a UE capability information message, and the second signaling is a registration accept message.

6. The method according to claim 1, wherein that the second signaling comprises indication information indicating that registration to the IMS network is not supported is that an attribute value of IMS VoPS in the second signaling is 0, and that the second signaling comprises indication information indicating that registration to the IMS network is supported is that the attribute value of IMS VoPS in the second signaling is 1.

7. A terminal, comprising: a processor, a memory, and a program or an instruction stored in the memory and executable on the processor, wherein the program or the instruction, when executed by the processor, causes the terminal to perform:

transmitting first network registration signaling to a current camped cell;

receiving second signaling transmitted by the current camped cell in response to the first network registration signaling; and in a case that the second signaling comprises indication information indicating that registration to the IMS network is not supported, performing one of the following:

performing a cell handover operation; or displaying first prompt information, wherein the first prompt information is used to prompt a user to move the terminal to another location to attempt registration to the IMS network;

wherein when performing a cell handover operation, the program or the instruction, when executed by the processor, causes the terminal to perform:

a determining step: determining a target cell from neighboring cells of the current camped cell of the terminal, and reporting a measurement report to a network side, wherein the measurement report is used for the network side to hand over the terminal from the current camped cell to the target cell;

a transmitting and receiving step: after the terminal is handed over to the target cell, transmitting first network registration signaling to the current camped cell, and receiving second signaling transmitted by the target cell in response to the first network registration signaling; and in a case that the second signaling comprises indication information indicating that registration to the IMS network is supported, performing registration to the IMS network; or in a case that the second signaling comprises indication information indicating that registration to the IMS network is not supported, repeating the determining step and the transmitting and receiving step until the received second signaling comprises indication information indicating that registration to the IMS network is supported or a quantity of cell handovers reaches a preset threshold.

8. The terminal according to claim 7, wherein the program or the instruction, when executed by the processor, causes the terminal to further perform:

in a case that the quantity of cell handovers reaches the preset threshold, displaying second prompt information, wherein the second prompt information is used to prompt the user that a current SIM card does not support an IMS service.

9. The terminal according to claim 7, wherein when determining a target cell from neighboring cells of the current camped cell of the terminal, the program or the instruction, when executed by the processor, causes the terminal to perform:

ranking the neighboring cells of the current camped cell of the terminal based on signal strength and/or signal quality, detected by the terminal, of the neighboring cells, wherein signal strength or signal quality or both of a cell ranked higher are better; and selecting and determining a cell ranked highest from the neighboring cells as the target cell, wherein the target cell determined in a current determining step is different from a target cell determined in any previous determining step.

10. The terminal according to claim 7, wherein before reporting a measurement report to a network side, the program or the instruction, when executed by the processor, causes the terminal to further perform:

receiving an RRC connection reconfiguration message transmitted by the network side; and adjusting signal strength and/or signal quality of the target cell in the measurement report based on a configuration parameter in the RRC connection reconfiguration message, so that the measurement report triggers the network side to hand over the terminal from the current camped cell to the target cell.

11. The terminal according to claim 7, wherein in a case that the current camped cell uses a 4G LTE network standard, the first network registration signaling is an attach request, and the second signaling is an attach accept message; or in a case that the current camped cell uses a 5G NR network standard, the first network registration signaling is a UE capability information message, and the second signaling is a registration accept message.

12. The terminal according to claim 7, wherein that the second signaling comprises indication information indicating that registration to the IMS network is not supported is that an attribute value of IMS VoPS in the second signaling is 0, and that the second signaling comprises indication information indicating that registration to the IMS network is supported is that the attribute value of IMS VoPS in the second signaling is 1.

13. A non-transitory readable storage medium, wherein the non-transitory readable storage medium stores a program or an instruction, wherein the program or the instruction, when executed by a processor of a terminal, causes the terminal to perform:

transmitting first network registration signaling to a current camped cell;

receiving second signaling transmitted by the current camped cell in response to the first network registration signaling; and in a case that the second signaling comprises indication information indicating that registration to the IMS network is not supported, performing one of the following:

performing a cell handover operation; or displaying first prompt information, wherein the first prompt information is used to prompt a user to move the terminal to another location to attempt registration to the IMS network;

wherein when performing a cell handover operation, the program or the instruction, when executed by the processor of the terminal, causes the terminal to perform:

a determining step: determining a target cell from neighboring cells of the current camped cell of the terminal, and reporting a measurement report to a network side, wherein the measurement report is used for the network side to hand over the terminal from the current camped cell to the target cell;

a transmitting and receiving step: after the terminal is handed over to the target cell, transmitting first network registration signaling to the current camped cell, and receiving second signaling transmitted by the target cell in response to the first network registration signaling; and in a case that the second signaling comprises indication information indicating that registration to the IMS network is supported, performing registration to the IMS network; or in a case that the second signaling comprises indication information indicating that registration to the IMS network is not supported, repeating the determining step and the transmitting and receiving step until the received second signaling comprises indication information indicating that registration to the IMS network is supported or a quantity of cell handovers reaches a preset threshold.

14. The non-transitory readable storage medium according to claim 13, wherein the program or the instruction, when executed by the processor of the terminal, causes the terminal to further perform:

in a case that the quantity of cell handovers reaches the preset threshold, displaying second prompt information, wherein the second prompt information is used to prompt the user that a current SIM card does not support an IMS service.

15. The non-transitory readable storage medium according to claim 13, wherein when determining a target cell from neighboring cells of the current camped cell of the terminal, the program or the instruction, when executed by the processor of the terminal, causes the terminal to perform:

ranking the neighboring cells of the current camped cell of the terminal based on signal strength and/or signal quality, detected by the terminal, of the neighboring cells, wherein signal strength or signal quality or both of a cell ranked higher are better; and selecting and determining a cell ranked highest from the neighboring cells as the target cell, wherein the target cell determined in a current determining step is different from a target cell determined in any previous determining step.

16. A chip, comprising a processor and a communication interface, wherein the communication interface is coupled to the processor, and the processor is configured to run a program or an instruction, to implement the steps of the method for registering to the IMS network according to claim 1.

17. A computer software product, wherein the computer software product is stored in a non-transient readable storage medium, and the computer software product is executed by at least one processor to implement the steps of the method for registering to the IMS network according to claim 1.

* * * * *